United States Patent
Lin

(10) Patent No.: US 10,491,978 B1
(45) Date of Patent: Nov. 26, 2019

(54) WATERPROOF MOLDED MESH FOR AUDIO TRANSDUCER

(71) Applicant: Google LLC, Mountain View, CA (US)

(72) Inventor: Wen Shian Lin, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/021,094

(22) Filed: Jun. 28, 2018

(51) Int. Cl.
*H04R 1/02* (2006.01)
*H04R 1/08* (2006.01)
*H04R 1/44* (2006.01)

(52) U.S. Cl.
CPC .............. *H04R 1/026* (2013.01); *H04R 1/086* (2013.01); *H04R 1/44* (2013.01); *B32B 2307/73* (2013.01)

(58) Field of Classification Search
CPC ................................ H04R 1/023; H04R 1/086
USPC ........................................ 381/391, 393, 189
See application file for complete search history.

(56) References Cited

U.S. PATENT DOCUMENTS

| | | | |
|---|---|---|---|
| 6,658,132 B1 | 12/2003 | Moster | |
| 9,573,165 B2 * | 2/2017 | Weber | B05D 5/04 |
| 9,763,341 B2 | 9/2017 | Kim | |
| 9,820,038 B2 | 11/2017 | Salvatti | |
| 2008/0298627 A1 | 12/2008 | Bonebright | |
| 2015/0036845 A1 * | 2/2015 | Lu | H04R 1/02 381/189 |
| 2015/0172796 A1 * | 6/2015 | Chao | B29C 45/14008 381/332 |
| 2015/0222985 A1 | 8/2015 | Lin | |
| 2016/0073183 A1 | 3/2016 | Auclair | |
| 2016/0165335 A1 * | 6/2016 | Goossens | H04R 31/00 381/351 |

FOREIGN PATENT DOCUMENTS

| | | | |
|---|---|---|---|
| CN | 2919719 Y | | 7/2007 |
| CN | 201118939 Y | | 9/2008 |
| CN | 202918352 U | | 5/2013 |
| CN | 204069290 U | * | 12/2014 |
| CN | 204145745 U | | 2/2015 |

* cited by examiner

*Primary Examiner* — Alexander Krzystan
(74) *Attorney, Agent, or Firm* — Morris & Kamlay LLP

(57) ABSTRACT

An apparatus is provided that includes features to protect an audio transducer that receives or outputs sound from moisture. The apparatus may include a metal mesh layer having at least a first surface and a second surface. A first silica gel layer may be disposed on the first surface of the metal mesh layer. A second silica gel layer may be disposed on the second surface of the metal mesh layer. A first adhesive layer may be disposed between a first surface of a housing of the apparatus and the first silica gel layer. The adhesive layer may be used to affix the metal mesh layer, first silica gel layer, and second silica gel layer to the housing of the apparatus. The audio transducer may be spaced from the second silica gel layer.

12 Claims, 5 Drawing Sheets

US 10,491,978 B1

WATERPROOF MOLDED MESH FOR AUDIO TRANSDUCER

BACKGROUND

Mobile computing devices, such as smartphones, often have microphones to capture sound, and one or more speakers to output sound. Such mobile devices may be exposed to forces (e.g., such as being dropped), weather elements (e.g., rain, snow, and the like), moisture (e.g., sweat from a user of the device, liquid spilled on the device, condensation from humidity, or the like), or other factors that can affect operability of the device. The speakers or microphones of the mobile computing device typically require a larger border around the display of the device in order to accommodate openings for the microphones or speakers. Large borders on the face of the mobile computing device typically result in undesirable aspect ratios between the display and the size of the mobile computing device.

BRIEF SUMMARY

According to an implementation of the disclosed subject matter, an apparatus includes an audio transducer to receive or output sound. The apparatus may include a metal mesh layer having at least a first surface and a second surface. A first silica gel layer may be disposed on the first surface of the metal mesh layer. A second silica gel layer may be disposed on the second surface of the metal mesh layer. A housing of the apparatus may have a first surface with an opening to accommodate at least a portion of the metal mesh layer. A first adhesive layer may be disposed between the first surface of the housing and the first silica gel layer to affix the metal mesh layer, first silica gel layer, and second silica gel layer to the housing of the apparatus, and the audio transducer may be spaced from the second silica gel layer.

According to an implementation of the disclosed subject matter, means for protecting an audio transducer from moisture are provided, including a metal mesh layer having at least a first surface and a second surface. A first silica gel layer may be disposed on the first surface of the metal mesh layer. A second silica gel layer may be disposed on the second surface of the metal mesh layer. A housing of the apparatus may have a first surface with an opening to accommodate at least a portion of the metal mesh layer. A first adhesive layer may be disposed between the first surface of the housing and the first silica gel layer to affix the metal mesh layer, first silica gel layer, and second silica gel layer to the housing of the apparatus, and the audio transducer may be spaced from the second silica gel layer.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter provide a combined molding of metal mesh and silica gel layers in a stack to provide a waterproof protection of an audio transducer, such as a speaker or microphone, in an opening of a device. The audio transducer may be spaced from the silica gel layers when the stack is disposed in the device. The device may be a smartphone, a tablet computer, a wearable computing device, virtual reality (VR) device, augmented reality (AR) device, a digital video recorder device, a digital camera device, a laptop computer, or the like. The device may include a processor, a display device, one or more input device, a communications interface, and the like. The opening in the device may accommodate the audio transducer, and the molded metal mesh and silica gel layers of the stack may allow sound to be received by and/or output by the audio transducer. The metal mesh layer may be stainless steel woven mesh wire. The woven mesh provides improved acoustic performance and/or acoustic impedance matching over a film-type mesh.

In implementations of the disclosed subject matter, the molded mesh and silica gel stack may have reduced dimensions in the Y-direction and Z-directions so that the device may have a thin profile and desired sound performance (e.g., acoustic impedance matching) while allowing the device to be waterproof. In some implementations, the device having the molded mesh and silica gel layers may have an ingress protection (IP) rating of IPX8 (i.e., the device is capable of being submerged in water deeper than 1 meter, and thus may be resistant to weather elements such as rain, snow, and the like, as well as moisture, sweat from a user of the device, liquid spilled on the device, condensation from humidity, or the like). The molded mesh and silica gel stack may improve the industrial design and/or aesthetic appearance of the device while providing audio input and/or output performance (e.g., the stack may have an audio impedance below a predetermined value). That is, the molded mesh and silica gel stack may allow for a border that surrounds a display of the device to be minimized, so that a higher aspect ratio display may be used with the device. The border is typically where an opening for a transducer may be placed, and the molded mesh and silica gel stack may minimize the area needed for an audio transducer, which may be disposed in a device so as to be spaced from the silica gel stack. The molded mesh and silica gel stack may allow for the device to have a thinner profile in the Z-direction, which may be desirable for use (e.g., holding of the device by the user), portability (carrying the device by a user), and/or storage of the device (e.g., in a pocket or bag by the user).

Figure 1:
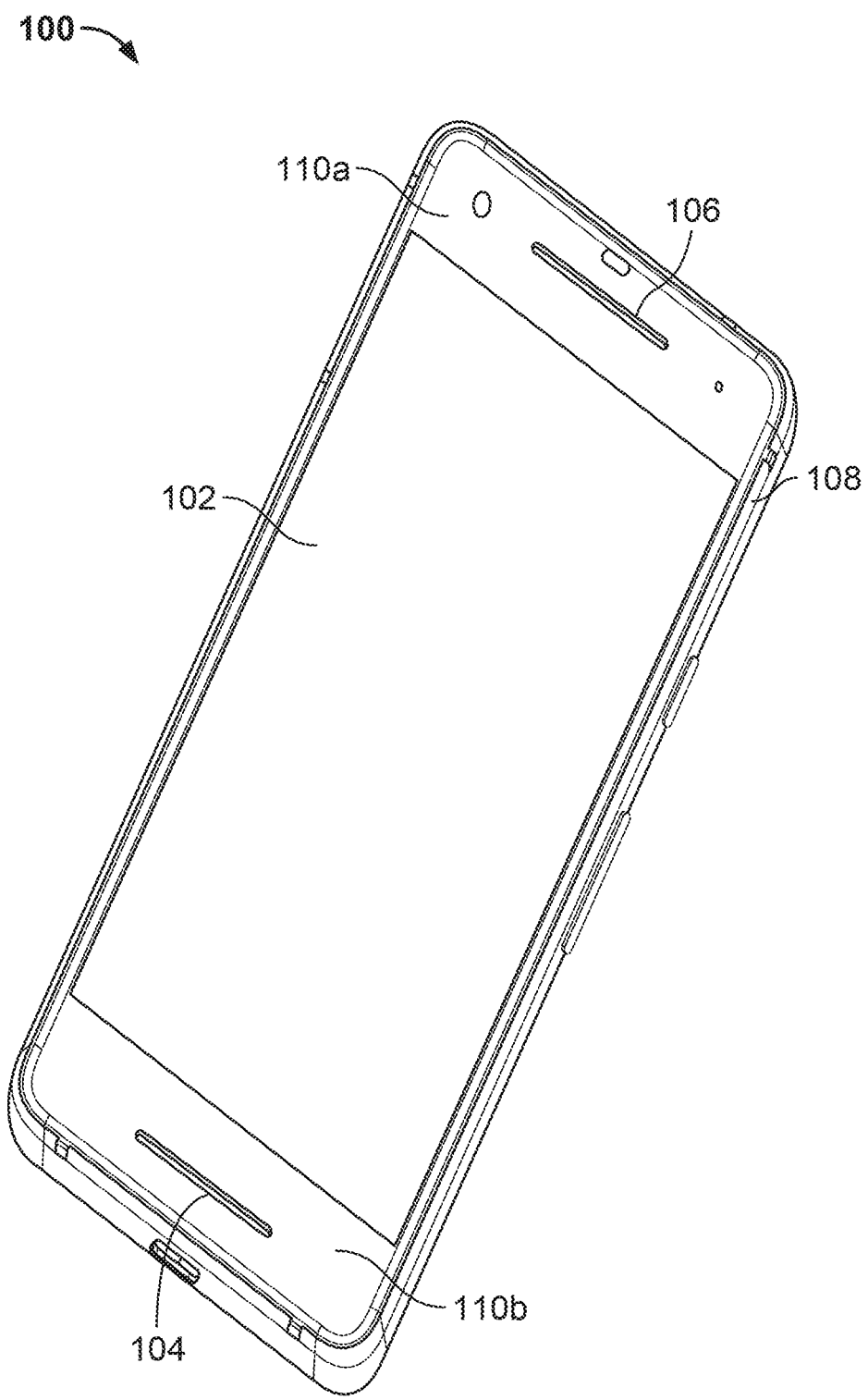
FIG. 1 shows a device having openings for audio transducers according to an implementation of the disclosed subject matter.
Figure 4:
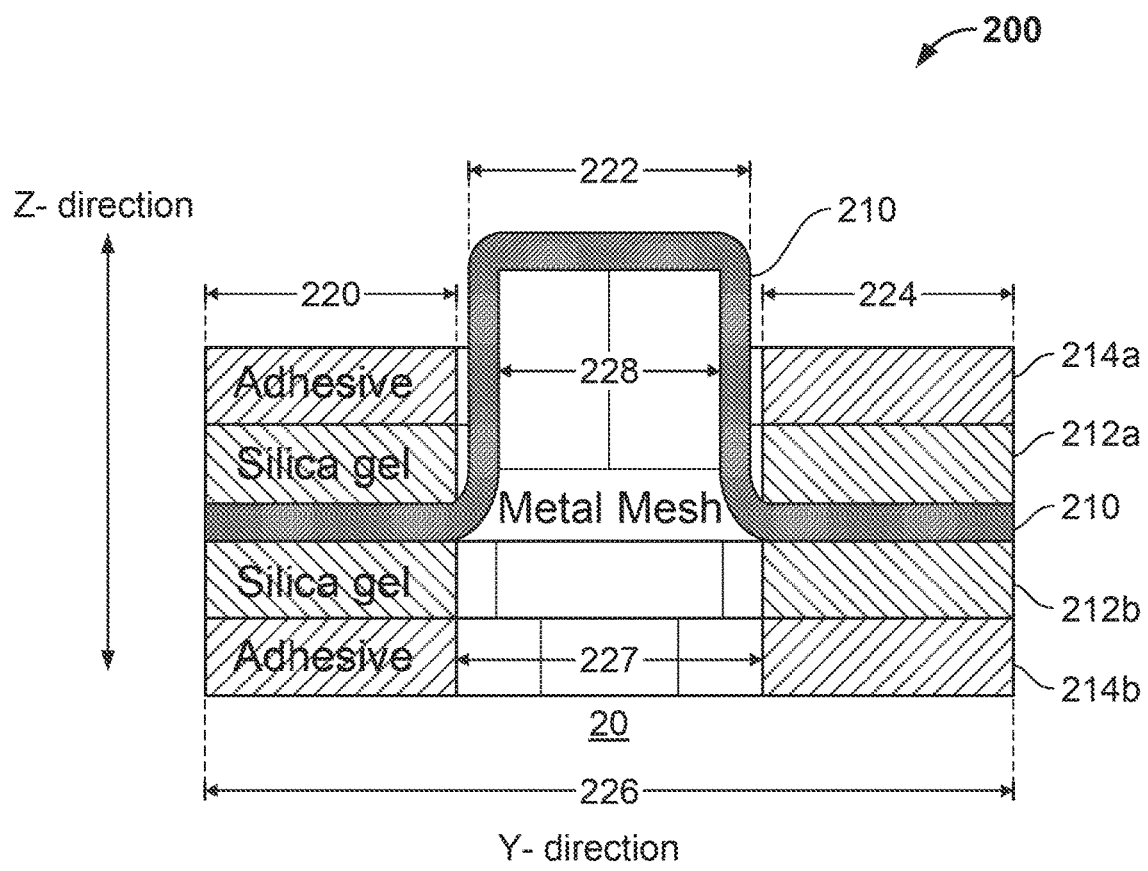
FIG. 4 shows a side profile of the wire mesh stack having silica gel and adhesive of FIG. 3 according to an implementations of the disclosed subject matter.

FIG. 1 shows a device having openings for audio transducers according to an implementation of the disclosed subject matter. A device 100 may include a display 102, which may be a touchscreen that may display information and receive selections. Openings 104, 106 may be for audio transducers, such as a speaker and/or a microphone, of the device 100. For example, opening 106 may be for a speaker, and opening 104 may be for a microphone. In some implementations, opening 104 may be for an audio transducer that operates as a microphone or a speaker. A wire mesh stack 200 (e.g., shown in FIG. 2 and described below) may be disposed in the openings 104, 106 and may cover the audio transducers, which may be spaced from the wire mesh stack 200 (e.g., as shown in (FIGS. 4, 5B, and 5C and described below). The device 100 may include a casing and/or housing 108 that the wire mesh stack 200 may be affixed to. The device 100 may have borders 110a, 110b disposed on opposite sides of the display 102. In implementations of the disclosed subject matter, the molded mesh and silica gel stack may allow for the size of borders 110a and/or 110b to be reduced in the Y-direction (see, e.g., FIGS. 4-5C), as well as for the size of the device 100 to be reduced in the Z-direction (see, e.g., FIGS. 4-5C). Example individual components of the device 100 may be shown in FIG. 6 and described below.

Figure 2A:
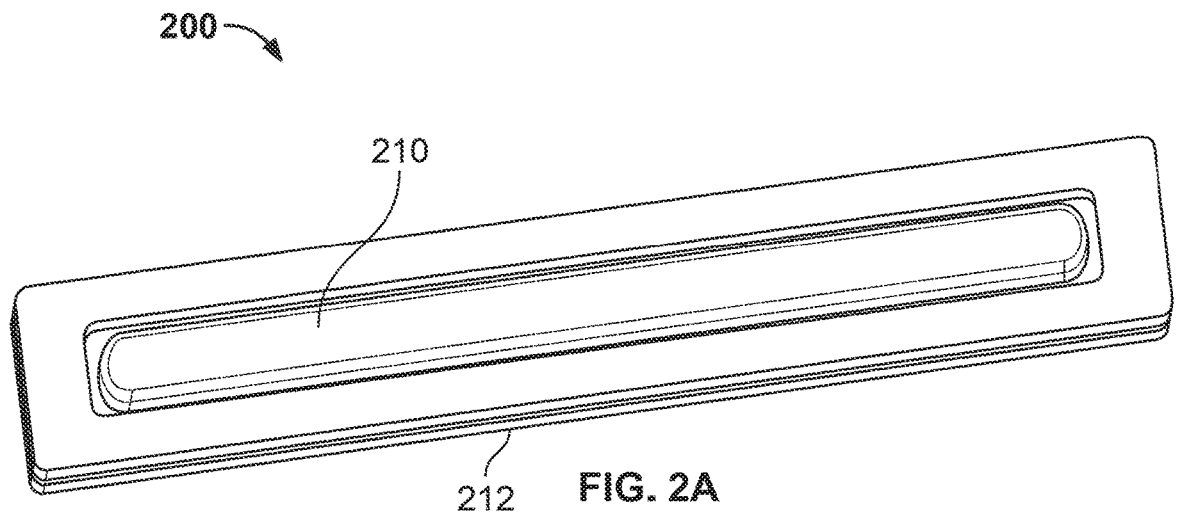
FIGS. 2A-2C show a wire mesh stack to be disposed in the audio transducer openings of the device of FIG. 1 according to an implementation of the disclosed subject matter.
Figure 2B:
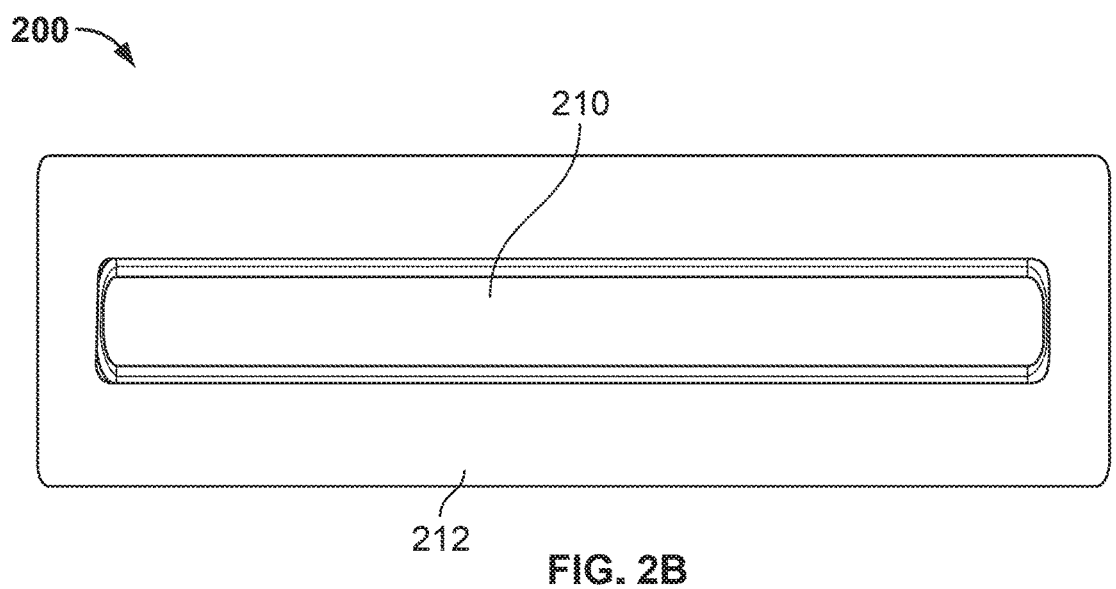
Figure 2C:
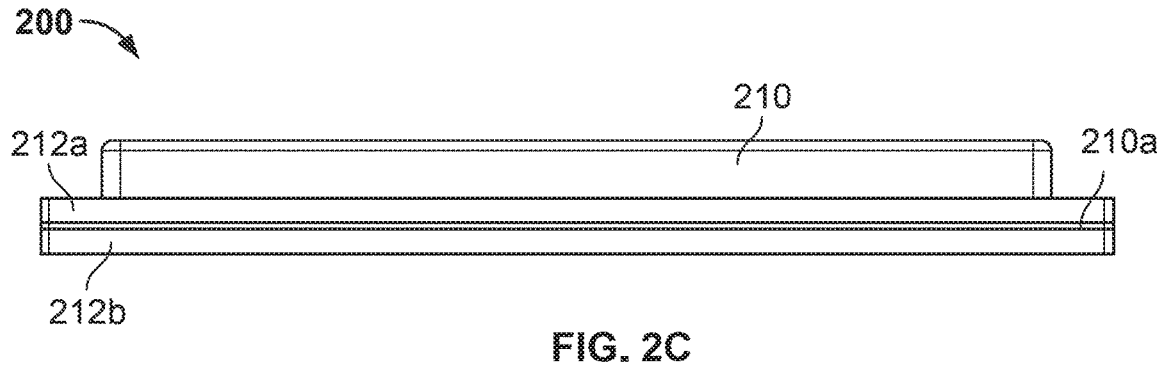

FIGS. 2A-2C show the wire mesh stack 200 to be disposed in the audio transducer openings (e.g., openings 104, 106) of the device of FIG. 1 so as to be space from an audio transducer according to an implementation of the disclosed subject matter. As shown in FIG. 2A, the wire mesh stack 200 includes a metal mesh layer 210 and a silica gel layer 212. The metal mesh layer 210 may be a woven arrangement of wires. In some implementations, there may be 150×150 wires per inch (150×150 wires per 2.54 cm). The diameter of each wire of the metal mesh layer 210 may be 0.0026 inches (0.06604 mm). The openings between the woven wires in the metal mesh layer 210 may be 0.0041 inches (0.10414 mm). The silica gel layer 212 may be molded to the metal mesh layer 210. The silica gel layer 212 may be formed from silica gel or any other suitable material that may increase the water resistance of the stack 200 while allowing sound to be received and/or transmitted through the stack 200.

FIG. 2B shows a top-down view of the wire mesh stack 200 having the metal mesh layer 210 and a silica gel layer 212. FIGS. 2A-2B show that the metal mesh layer 210 may be surrounded by the silica gel layer 212.

FIG. 2C shows a side view of the wire mesh stack 200 having the metal mesh layer 210 and a silica gel layer 212. FIG. 2C shows a portion 210a of the metal mesh layer 210 disposed between the silica gel layers 212a, 212b. In some implementations, the silica gel layers 212a and 212b may be molded onto opposite sides of portion 210a of the metal mesh layer 210. The selection and molding of the silica gel layers 212a, 212b and the metal mesh layer 210 may be to provide a predetermined acoustic impedance and/or water resistance characteristics.

Figure 3:
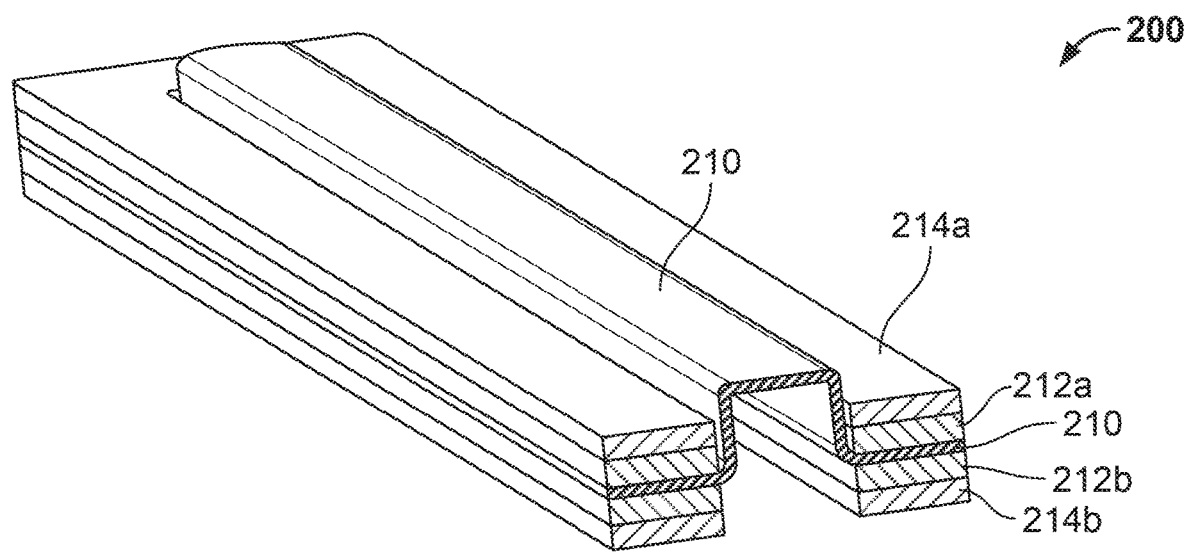
FIG. 3 shows a wire mesh stack having silica gel and adhesive that may be disposed in the audio transducer openings of the device of FIG. 1 according to an implementation of the disclosed subject matter.

FIG. 3 shows the wire mesh stack 200 of FIGS. 2A-2C having adhesive to be disposed in the audio transducer openings of the device of FIG. 1 according to an implementation of the disclosed subject matter. As shown in FIG. 3, the wire mesh stack 200 may include the metal mesh layer 210. The silica gel layers 212a may be disposed on first surfaces of the metal mesh layer 210. Adhesive layers 214a may be disposed on the silica gel layer 212a. The silica gel layer 212b may be disposed on second surfaces of the metal mesh layer 210, and adhesive layers 214b may be disposed on the silica gel layer 212b. The adhesive layers 214a, 214b may be used to affix the wire mesh stack 200 to portions of the device 100. In some implementations, the metal mesh layer 210, the silica gel layers 212a, 212b, and the adhesive layers 214a, 214b may be molded together. Alternatively, the metal mesh layer 210, the silica gel layers 212a, 212b may be molded together, and the adhesive layers 214a, 214b may be respectively disposed on the silica gel layers 212a, 212b of the molded arrangement. In some implementations, the molding process may inject the silica gel so as to fill the openings between the wires in the metal mesh layer 210.

FIG. 4 shows a side profile of the wire mesh stack having silica gel and adhesive of FIG. 3 that may be spaced from an audio transducer according to an implementations of the disclosed subject matter. The wire mesh stack 200 may include the metal mesh layer 210. The silica gel layers 212a may be disposed on first surfaces of the metal mesh layer 210. Adhesive layers 214a may be disposed on the silica gel layer 212a. The silica gel layer 212b may be disposed on second surfaces of the metal mesh layer 210, and adhesive layers 214b may be disposed on the silica gel layer 212b. As discussed above in connection with at least FIG. 3, the metal mesh layer 210, the silica gel layers 212a, 212b, and/or the adhesive layers 214a, 214b may be molded together. An audio transducer 20 may be disposed below and/or spaced from the stack 200. The audio transducer 20 may in included in device 100, as shown in FIG. 6. In some implementations, the audio transducer 20 may be disposed so as to protrude into a channel between the silica gel layers 212b and/or adhesive layers 214b having dimension 227 (e.g., as shown in FIG. 5B). In some implementations, the audio transducer 20 may protrude towards an interior channel of the metal mesh layer 210 having dimension 228 (as shown in FIG. 5C).

FIG. 4 shows dimensions 220, 222, 224, and 226 of the stack 200 in a Y-direction. In some implementations, dimensions 220, 224 may be 1.05 mm, and dimension 222 may be 1.2 mm. Dimension 226 may 3.3 mm, where dimension 226 is the sum of dimensions 220, 222, and 224. That is, the molding of the wire mesh stack 200 may reduce the dimensions in the Y-direction so as to be about 3.3 mm, which is less than a typical device, which have dimensions of about 5.8 mm. This may reduce the size of the borders (e.g., borders 110a, 110b) that surround the display 102 of the device 100, so that a higher aspect ratio display may be used with the device.

In some implementations, the stack 200 may be reduced in the Z-direction compared to arrangements in typical devices. The adhesive layers 214a and 214b may each have a dimension of 0.2 mm, the silica gel layers 212a and 212b may each have a dimension of 0.2 mm, and the metal mesh layer 210 may have a dimension of 0.1 mm. That is, the total dimension in the Z-direction of the stack 200 may be 0.9 mm, and may be compressed to 0.75 mm. These Z-direction dimensions may be less than the Z-direction dimensions of typical devices (e.g., which may result in a thinner device 100). The reduced Z-dimensions may allow for the device 100 to have a thinner profile in the Z-direction, which may be desirable for use, portability, and/or storage.

Figure 5A:
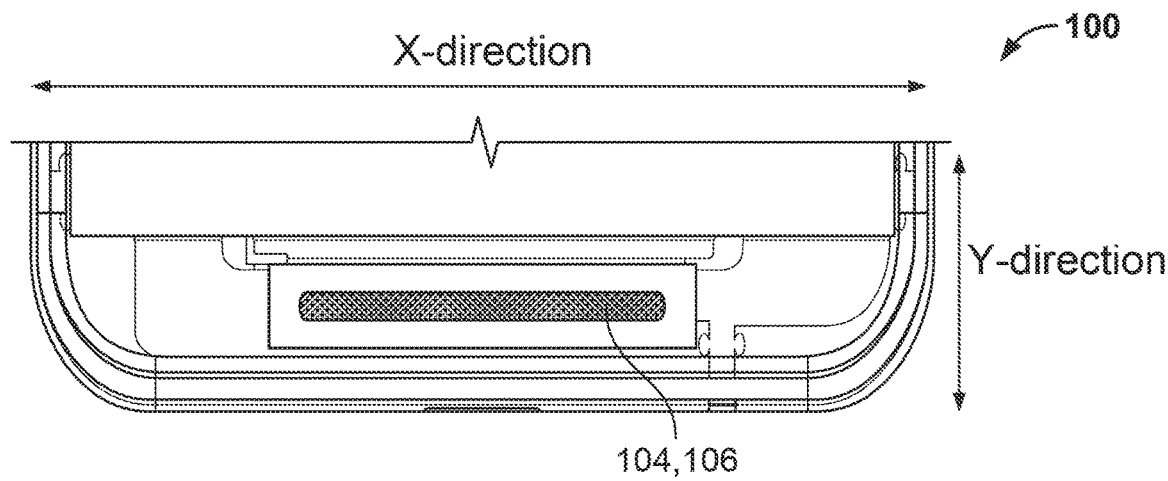
FIGS. 5A-5C show the wire mesh stack disposed in the audio transducer opening of the device according to an implementation of the disclosed subject matter.
Figure 5B:
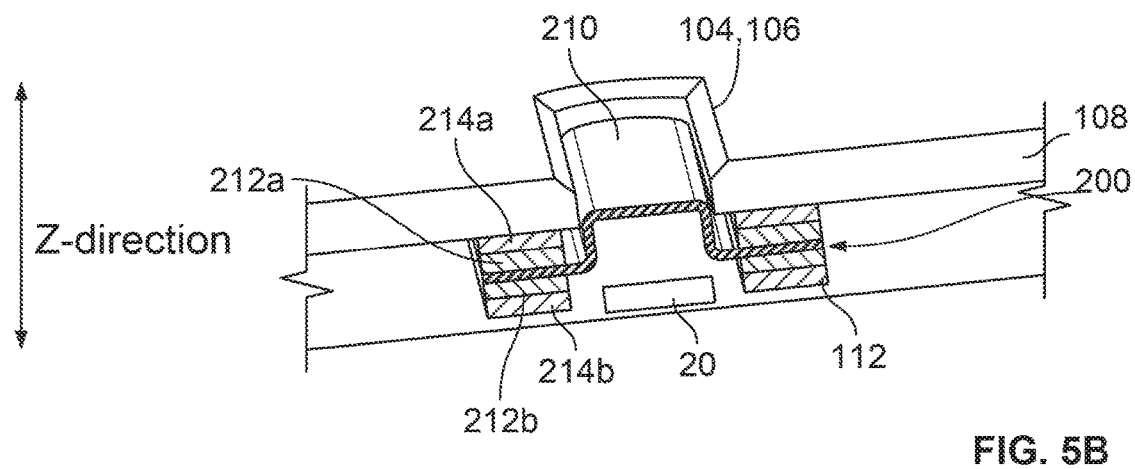
Figure 5C:
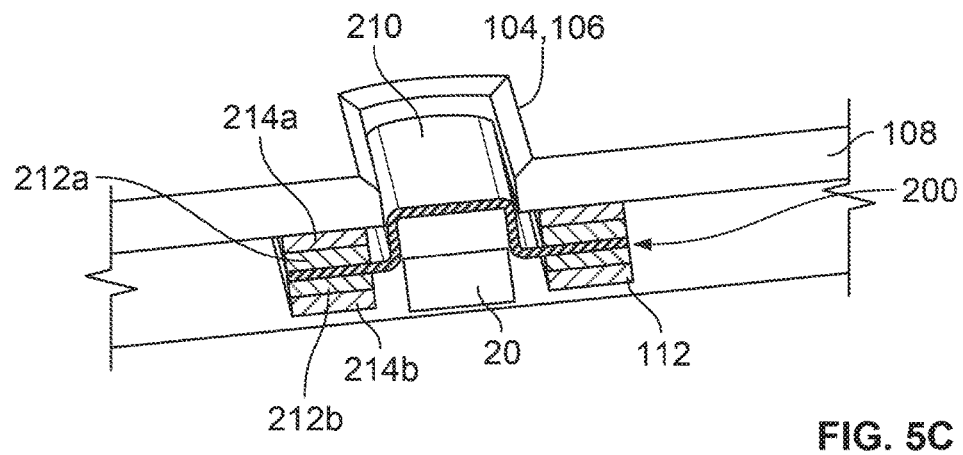
Figure 6:
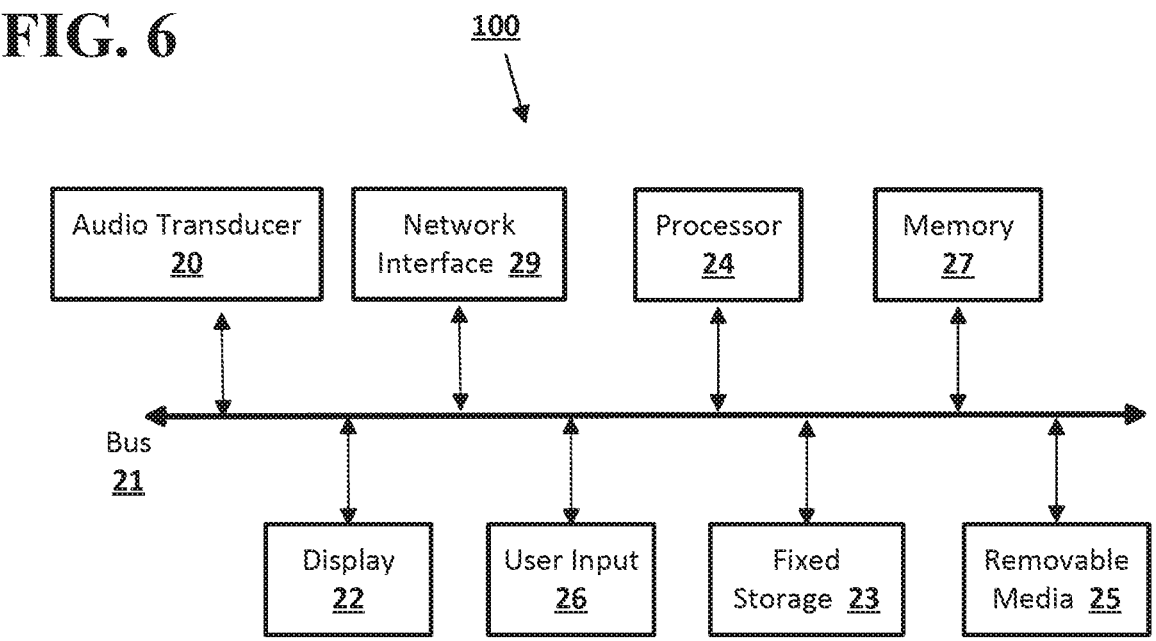
FIG. 6 shows a computing device, such as the device shown in FIG. 1, according to an implementation of the disclosed subject matter.

FIGS. 5A-5C show the wire mesh stack disposed in the audio transducer opening of the device according to an implementation of the disclosed subject matter. FIGS. 5A-5B show the opening 104, 106 of the device 100 where the stack 200 may be disposed. FIGS. 5B-5C show how the stack 200 may be disposed within the housing 108 of the device 100 so as to be spaced from the audio transducer 20. The stack 200 may include the metal mesh layer 210. The silica gel layers 212a may be disposed on first surfaces of the metal mesh layer 210. Adhesive layers 214a may be disposed on the silica gel layer 212a, and the adhesive layers 214a may be affixed to a surface of the housing 108. The silica gel layer 212b may be disposed on second surfaces of the metal mesh layer 210, and adhesive layers 214b may be disposed on the silica gel layer 212b. The adhesive layers 214b may be affixed to surface 112 of the device 100. As shown in FIG. 5B, the audio transducer 20 may be disposed below and/or spaced from the metal mesh layer 210 so as to be adjacent to the silica gel layers 212b and adhesive layers 214b, where the audio transducer is disposed on the surface 112 of the device 100. As shown in FIG. 5C, the audio transducer 20 may be disposed in a channel below and/or spaced from the metal mesh layer 210 (e.g., the channel having dimension 228 shown in FIG. 4), where the audio transducer is disposed on the surface 112 of the device 100.

Implementations of the presently disclosed subject matter may be implemented in and used with a variety of component and network architectures. FIG. 6 is an example computing device 100 suitable for implementing implementations of the presently disclosed subject matter. The device 100 may be, for example, a desktop or laptop computer, or a mobile computing device such as a smart phone, tablet, or the like. The device 100 may include a bus 21 which interconnects major components of the device 100, such as the audio transducer 20, a central processor 24, a memory 27 such as Random Access Memory (RAM), Read Only Memory (ROM), flash RAM, or the like, a user display 22 such as a display screen (e.g., display 102 shown in FIG. 1), a user input interface 26, which may include one or more controllers and associated user input devices such as a keyboard, mouse, touch screen (e.g., display 102 shown in FIG. 1, which may be a touch screen), and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The audio transducer 20 may be an audio speaker to output sound, and/or a microphone to receive sound. The audio transducer 20 may be disposed in the openings 104, 106 of the device 100 shown in FIG. 1.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 100 are generally stored on and accessed via a computer readable medium, such as a hard disk drive (e.g., fixed storage 23), an optical drive, floppy disk, or other storage medium.

The fixed storage 23 may be integral with the device 100 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
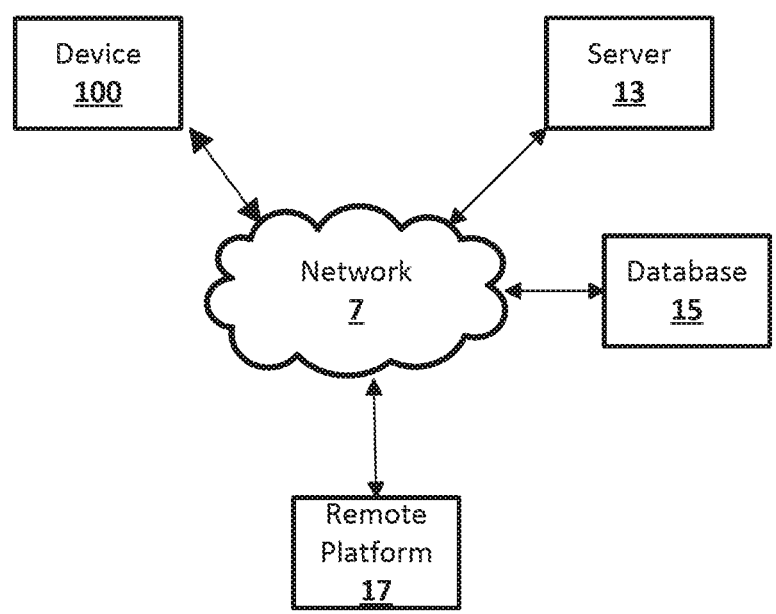
FIG. 7 shows a network configuration that includes the device of FIGS. 1 and 6 according to an implementation of the disclosed subject matter.

FIG. 7 shows an example network arrangement according to an implementation of the disclosed subject matter. One or more of the device 100, such as smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the device 100, or one or more other devices may provide intermediary access such as where a server 13 provides access to resources stored in a database 15. The device 100 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. An apparatus that includes an audio transducer to receive or output sound, the apparatus comprising:
   a metal mesh layer having a u-shaped side profile having at least a first surface and a second surface, with elongated edges formed at the opening of the u-shaped profile;
   a first silica gel layer disposed on the elongated edges of the first surface of the metal mesh layer;
   a second silica gel layer disposed on the elongated edges of the second surface of the metal mesh layer;
   a housing having a first surface with an opening to accommodate at least a portion of the u-shaped side profile of the metal mesh layer; and
   a first adhesive layer disposed between the first surface of the housing and the first silica gel layer to affix the metal mesh layer, first silica gel layer, and second silica gel layer to the housing of the apparatus,
   wherein the audio transducer is spaced from the second silica gel layer within the apparatus.

2. The apparatus of claim 1, further comprising:
   a second adhesive layer disposed between a surface of at least one device disposed in the housing and the second silica gel layer.

3. The apparatus of claim 2, wherein the first and second adhesive layers and the first and second silica gel layers have openings, and
   wherein a portion of the metal mesh layer is disposed in the openings of at least the first silica gel layer and the first adhesive layer.

4. The apparatus of claim 3, wherein the openings are 1.2 mm in diameter, and sides of the first and second adhesive layers and the first and second silica gel layers that are disposed on opposite sides of the openings along a y-direction are 1.05 mm.

5. The apparatus of claim 2, wherein a thickness of each of the first adhesive layer and the second adhesive layer in a z-axis direction is 0.2 mm.

6. The apparatus of claim 2, wherein a total thickness of the first and second adhesive layers, the first and second silica gel layers, and the metal mesh layer is 0.75 mm-0.9 mm.

7. The apparatus of claim 1, wherein a thickness of each of the first silica gel layer and the second silica gel layer in a z-axis direction is 0.2 mm.

8. The apparatus of claim 1, wherein a thickness of the metal mesh layer in a z-axis direction is 0.1 mm.

9. The apparatus of claim 1, wherein the metal mesh layer comprises:
   a plurality of metal wires, with each wire having a diameter of 0.06 mm,
   wherein the plurality of wires are spaced from each other to form 0.1 mm openings.

10. The apparatus of claim 1, wherein the metal mesh layer and the first and second silica gel layers are molded together.

11. The apparatus of claim 1, wherein the apparatus is selected from the group consisting of: a smartphone, a tablet computer, a wearable computing device, virtual reality (VR) device, augmented reality (AR) device, a digital video recorder device, a digital camera device, and a laptop computer.

12. The apparatus of claim 11, wherein the apparatus further comprises at least one from the group consisting of: a processor, a display device, an input device, and a communications interface.

* * * * *